United States Patent [19]
Dixon et al.

[11] 4,218,741
[45] Aug. 19, 1980

[54] PAGING MECHANISM

[75] Inventors: Jerry D. Dixon; Joel C. Leininger, both of Boca Raton, Fla.

[73] Assignee: International Business Machines Corporation, Armonk, N.Y.

[21] Appl. No.: 918,221

[22] Filed: Jun. 23, 1978

[51] Int. Cl.² .............................................. G06F 9/20
[52] U.S. Cl. .................................. 364/200; 364/900
[58] Field of Search ................ 364/200, 900 MS File

[56] References Cited

U.S. PATENT DOCUMENTS

| | | | |
|---|---|---|---|
| 3,775,756 | 11/1973 | Balser | 364/200 |
| 3,980,992 | 9/1976 | Levy et al. | 364/200 |

OTHER PUBLICATIONS

IBM Tech. Disc. Bull., V. 19, #8, pp. 2877–2878, Jan. 1977, "Paging Sys. for ROS-Controlled Machine", G. A. Pitt et al.
IBM Tech. Disc. Bull., V. 19, #9, pp. 3266–3267, Feb. 1977, "M—Processor with Additional Random-Access Memory", J. D. Dixon.
IBM Tech. Disc. Bull., V. 19, #9, pp. 3270–3273, Feb. 1977, "Instr. Fetch/Exe. Overlap Method for a M—Processor Used as a M—Controller", Dixon.
IBM Tech. Disc. Bull, V. 20, #1, pp. 334–336, Jan. 1977, "M—Interrupt Via Forced Br. & LK Instr.", Booth et al.

*Primary Examiner*—Gareth D. Shaw
*Assistant Examiner*—David Y. Eng
*Attorney, Agent, or Firm*—John C. Black

[57] ABSTRACT

In a data processing system, a mechanism provides independent assignment of page locations for a program's instructions and its data and better enables control to be transferred between programs, or portions thereof, that reside at different addresses in different pages of a multiple page instruction store. The initial linkage is established through the use of a Branch And Link instruction. Subsequent linkages are established through the use of Return and Link instructions, each of which transfers control to a previous program, or program segment, while simultaneously establishing the linkage for a subsequent return to this program or program segment.

9 Claims, 2 Drawing Figures

PAGING MECHANISM

INTRODUCTION

CROSS REFERENCES TO RELATED APPLICATIONS

U.S. Patent application of J. D. Dixon, one of the co-inventors herein, Ser. Nos. 866,425, filed Jan. 3, 1978 and 918,223, filed of even date herewith, both assigned to the assignee of the present invention, show and describe, but do not claim, portions of the invention claimed in the present invention.

BACKGROUND OF THE INVENTION

This invention relates to mechanisms for permitting program instructions and data to reside in the same or different pages of storage independently of each other and for facilitating communication between programs, or program segments, in different pages within a data processing system. More particularly, it relates to such a mechanism that is particularly useful in a small microprogrammed controller with insufficient address fields to access all of the storage which it is desired to utilize. An example of this type of small controller is shown and described at pages 3270–3273 of the Technical Disclosure Bulletin, Vol. 19 No. 9, published February, 1977 by the International Business Machines Corporation.

The present invention is particularly useful in a microprocessor (or microcontroller) specifically adapted for control of I/O (input-output) devices. In such a controller maximum speed of operation, minimum cycle time is desirable. To optimize cycle time, all instructions are fixed at one processor cycle time—multiple fetches are not permitted. No address calculation is permitted.

With these restrictions, paging is required to access memory larger than that defined by the maximum address structure in an instruction. Hardware paging is required for efficient instruction branches from one page to another.

Paging mechanisms are known in the art and are often incorporated in processors where the maximum number of bits in the processor's address structure is insufficient to directly address all of the storage which is required for a particular application.

Examples of paging structures are shown and described in the Technical Disclosure Bulletin, Volume 19 No. 8, pages 2877, 2878, and Volume 19, No. 9, pages 3266, 3267, published Jan. 1977 and February 1977 respectively, by International Business Machines Corporation.

However, to the best of applicant's knowledge, no paging mechanism has been suggested which uses separate page registers, dynamically changeable under program control, for a program's instructions and its data so that the data may reside in the same page as, or a different page, than the instructions, independent of the instructions. With a minimum of hardware and software support, significant paging flexibility is achieved.

In the preferred embodiment, the invention is incorporated in a micro-controller in which the instruction fetch and execute functions are overlapped. During the execution of one instruction, the next instruction is being fetched from memory. Care must be taken therefore in Branch and Link Type instructions to assure storing of the correct D/I bits with the current program instruction address bits.

In a data processing system, particularly that part of a system which is used as a controller for, for example, a plurality of input/output (I/O) devices, it may be necessary for the system to execute separate control programs substantially concurrently even though they may run at asynchronous rates. In order to accomplish this, there must be a mechanism for transferring control between the two programs.

A well known mechanism for accomplishing interaction between programs depends upon a hardware register which preserves, for a limited time, an indication of the memory address of an instruction in a program from which control was transferred. That instruction would typically be a (conditional or unconditional) branch instruction. If there would be a need to return control back to the original program, the contents of this register would have to be saved for subsequent utilization in returning. The saving of the contents of this register used storage (for the save instruction) and time (for the execution of the instruction) while accomplishing no other useful work.

Some of the disadvantages of the system described above were overcome in the 1960's by the provision of a computer instruction called "Branch And Link". This instruction was implemented by hardware which, in response to the instruction, caused a branch to a particular address specified by the instruction, and automatically stored in a "link register" an indication of the address from which control was transferred. Subsequently, the execution of another instruction called "Return" would cause control to be transferred to the instruction at the address indicated by the link register. Thus, a programmer was able very easily to cause the exiting from a main stream of coding to a sub-routine, and then return to the main stream, by using two simple instructions with no need to concern himself with storing the contents of any particular registers.

The improved paging structure of the present application must interact efficiently during these Branch and Link and Return instructions.

SUMMARY OF THE INVENTION

In the preferred embodiment, a novel paging mechanism is provided for efficient, yet flexible processor operation. A first hardware register I is provided to store the number (address) of the page in which the next instruction of the current program is stored and a second hardware register D stores the number of the page in which the next selected data for that program resides. By the use of Set Data Page (Set D) and Set Instruction Page (SI) instructions, the page numbers in the D/I registers can be changed at will by the programmer to achieve maximum flexibility in locating instructions and data.

During instruction fetches, the I register contents are gated to a page decode circuit for selecting the page in which the instruction resides. At the same time, the offset address within the page is gated to a storage address register SAR to select the instruction location within the selected page.

During data load and store operations the D register contents are gated to the page decode circuit to select the page in which the data resides; and the offset address within the page is gated to the SAR to fetch or store the desired data.

The controller of the preferred embodiment has an overlapped instruction fetch/execution mode of operation. The formation of the address of the next instruction must therefore occur in the early part of the processor cycle. If, during a Set Instruction Page (SI) Instruction, the I register were set to the new page value and then the value were gated to the select circuit concurrent with setting the next address offset bits in the SAR, the SI instruction would in effect cause a branch to the new page; and, because the only offset address bits available are those in the SAR, the branched to address could only be that one offset address in the new page. This results in serious inflexibility.

Hence, in the preferred form of the invention, the setting of the I register is delayed until the next instruction fetch is made, which fetch uses the old I bit. This causes fetching of the next sequential instruction after the SI instruction. This next instruction is one of the various Branch type instructions and includes within its branch address field the offset address of the branched to instruction in the new page defined by the new bit in the I register.

A Set Data Page Instruction similarly sets the D register late in the execution cycle so that the old page value can be saved in the Link Register if a Branch and Link Instruction follows the Set Data Page Instruction.

Another problem arises for the Branch and Link instructions which set the Link Register from the IAR register. For example, during a Branch and Link (BAL) Instruction which follows a SI instruction, the old D/I bits (prior to setting a new I bit in the I register) must be stored in the Link Register during the execution of the BAL instruction. However, during the preceding SI execution the old I bit was destroyed.

Hence, in the preferred embodiment of the invention, a Delay register is interposed between the D/I registers and the Link Register. During each instruction execution, the contents of the D/I registers are gated into the Delay register. Upon occurrence of a branch and link instruction, the contents of the Delay Register will contain the old value of the D/I registers. As a result, the old D/I page values are available for storing in the link register whenever a new page value has been set (Set I or Set D) in the instruction cycle immediately preceding a Branch and Link type of instruction.

BRIEF DESCRIPTION OF THE DRAWINGS

The above and other features and advantages of this invention will be apparent from the following detailed description of a preferred embodiment of the invention as illusrated in the accompanying drawings in which.

DETAILED DESCRIPTION

This invention is preferably implemented as part of a small stored program controller which controls a wide range of I/O devices for larger processors. The following description will, for the most part, be limited to those portions of the controller which interact directly with this invention, or which are essential to its operation. Further details of such portions, as well as other portions of a controller are generally well known to those skilled in the art and need no further description here.

General Data Flow

Figure 1:
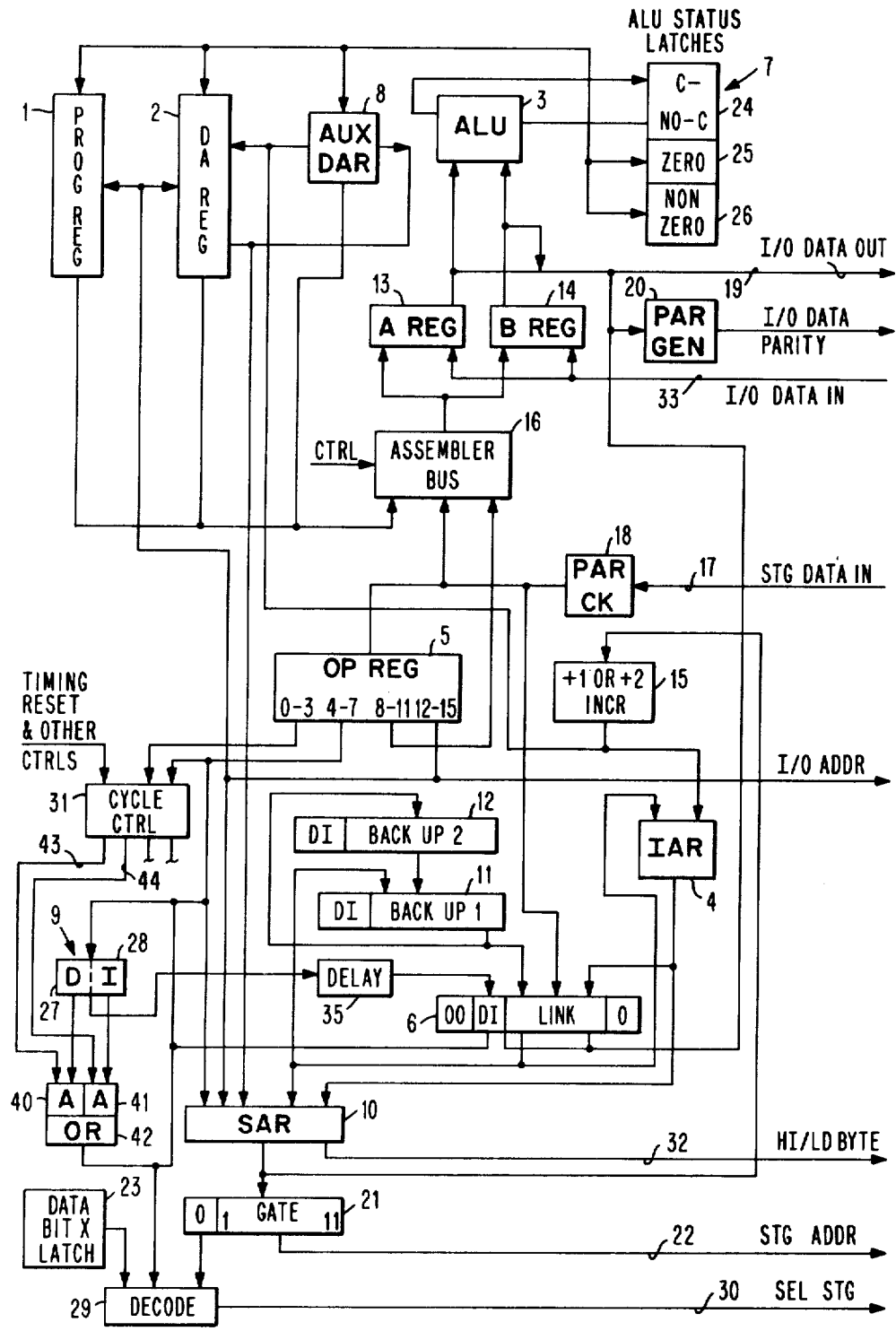
FIG. 1 is a block diagram of a microprogrammed control unit embodying this invention.

FIG. 1 shows the data flow of the examplary stored program controller. Input data coming into the controller goes to positions PR0 and PR1 of a Program Register Stack 1. The high-order four bits of the data go to PR0, while the low-order four bits go to PR1. Output data leaving the controller goes from PR0 to PR1 of the Program Register Stack. Data from any two registers in the Program Register Stack and/or a Data Address Register (DAR) Stack 2 may be sent through the Arithmetic and Logical Unit ALU 3 and the result placed in either stack. The ALU can perform the functions ADD, SUB, AND, OR and XOR. In addition, MOVE, COMPARE, TEST, and SHIFT functions may be performed in six different origin-destination modes.

Data from a read only or read-write storage medium (not shown) may be placed in the stacks or (if read-write storage is used) data from the stacks may be written to storage. Instructions as addressed by an Instruction Address Register (IAR) 4 are placed in an Operation Register 5. A Branch target address may come from the immediate data in the instruction, from a DAR or from a Link Register 6.

Status latches 7 are set by instructions using the ALU. These latches may be used in Test and Branch instructions to alter the instruction flow.

Data Flow Units

The principal units in the data flow of the controller which incorporates this invention are shown in FIG. 1.

A stack 2 of Data Address Registers (DAR) contain sixteen four-bit general purpose registers that each have the capacity to be loaded with the binary representation of a decimal number from zero (0) to fifteen (15). DAR 0, 1 and 2 are also used to address storage and on storage operations contain a twelve-bit storage address. An Auxiliary DAR 8 contains three four-bit registers that have the capacity to be loaded with the binary representation of a decimal number from zero (0) to fifteen (15). Control between the use of DAR 2 or Auxiliary DAR 8 to address storage on a storage operations is accomplished by program instructions Select DAR Active or Select Auxiliary DAR Active.

There are sixteen four-bit general purpose registers called Program Registers (PR) 1 that have the capacity to be loaded with the binary representation of a decimal number from zero (0) to fifteen (15). Data from I/O devices is loaded into the first two Program Registers (0 to 1). Data to I/O devices is also taken from PR0 and 1.

The Operation Register 5 is a sixteen-bit register which receives all instructions from storage. Bits 0–7 of an instruction word contain the Operation Code and bits 8–11 and 12–15 contain the addresses and/or mask data.

The Instruction Address Register (IAR) 4 is a twelve-bit register (bits 0–11) which contains the address of the next instruction to be executed. During Initial Program Load (IPL), the IAR contains the byte address of the I/O device data being loaded into consecutive addresses of storage starting at address zero. The low order bit (No. 11) selects the Hi or Low byte of a word.

To allow for increased storage capacity, a pair of D and I registers 9 is provided. The use of separate D and I registers permit program data to be stored in any page irrespective of the location of the program instructions. The twelve-bit Address Registers, IAR 4 and Storage Address Register SAR 10, can address 4096 (4k) bytes, or 2048 (2K) words. The registers 9 comprise a D (Data) and an I (Instruction) register which also extend addressing beyond 2K words in 2K word increments or pages for Data and Instructions, respectively.

For purposes of this detailed description it will be assumed by way of example that each D and I register contains only 1 latch which permits the use of two 2K word pages. It will be appreciated that the registers 9 in commercial applications will each contain as many latches as are required to accommodate the number of pages of storage that are used.

When the D (or I) latch is set, the DAR (or IAR) addresses the upper 2K storage words; when the latch is reset, the DAR (or IAR) addresses the lower 2K words. These latches are set and reset by Set Data High (SDH) and Set Data Low (SDL) or Set Instruction High and Set Instruction Low (SIL) instructions, respectively.

There are three registers, the Link register 6 and two Backup Registers 11 and 12 which provide the ability to transfer control from program to program and from program to subprogram. The Link Register has fifteen bits in the preferred embodiment. For reasons unrelated to this invention, the two high order bits are zero. The third and fourth bits indicate the setting of the Data Hi and Instruction Hi Latch status bits 9. The fifth through fifteenth bits are eleven address bits (bits 0–10). (The low order address bit (No. 11) is always zero during Link operations as only full word instruction addressing is used in this embodiment.) The two Backup registers 11 and 12 each have thirteen bits; the Data Hi and Instruction Hi latch bits and eleven address bits (bits 0–10). On a Branch and Link (BAL) instruction, the Link Register 6 is loaded with the contents of the IAR 4 (address after the BAL instruction) and the D and I latches 9. This will allow a subsequent Return (RTN) Instruction to return the program to the next sequential instruction in the stored program and set the D and I latches as they were prior to the execution of the BAL Instruction. Should a second BAL Instruction be executed, before a RTN instruction is executed, the contents of Link Reg 6 will be transferred to the first Backup Register 11 and the new IAR Value and D/I Latch status bits put in Link. Should a third BAL instruction be executed, the contents of the first Backup register will go to the second Backup Register 12. Link contents will be transferred to Backup Register 11 and the new IAR Value and D/I status put in Link. (The Backup registers in the preferred embodiment cannot be addressed or modified in any way by programming.)

Execution of RTN instructions will cause the reverse sequence as a BAL. Successive RTN instructions before another BAL will cause the program to Branch to the address in the Link Register 6 to continue program execution and also transfer the contents of Backup Reg 11 to Link and Backup Reg 12 to Backup Reg 11.

Execution of a Return And Link (RAL) instruction will cause the contents of the Link Reg 6 to be used for the next instruction address (as with a RTN instruction) *and* will cause the contents of the IAR 6 and the D/I latches 9 to be stored in the Link Reg 6. The transfer of IAR contents and D/I latches to Link Reg is similar to the tranfer when executing a BAL, but in the preferred embodiment, execution of the RAL does not affect Backup Regs 11 and 12.

The Storage Address Register (SAR) 10 is a twelve-bit register (Bits 0–11) which contains the address of the instruction or data word being accessed in storage. If extended storage (beyond 2K words) is used, the status of the D latch (on data fetches) or the I latch (on instruction fetches) determines whether the upper or lower half of storage is addressed.

The instruction address is transferred to SAR 10 from the IAR 4 if the next sequential instruction is to be executed or from the OP Register 5 if a branch occurs. On a RTN or RAL instruction, the contents of the Link Register 6 is transferred to the SAR 10. Storage Byte Data addresses are tranferred to SAR from the Operation Register 5 or from the DAR stack 2. Three registers of the DAR stack 2 are needed to provide a twelve-bit address.

The A and B Registers 13 and 14 are four-bit registers. They contain the Hi and Lo order bits, respectively, during byte data transfer from the Data Bus In or to the Data Bus Out. The A Reg 13 and B Reg 14 will contain the data to be operated on in the ALU 3 for arithmetic-logical operations. During these operations, the contents of the register indicated by the X-Field or Mask data would be set into the A Reg. The contents of the register indicated by the Y-Field would be set into the B Reg.

A twelve-bit Incrementer 15 will increment the contents of the DAR 2 or the IAR 4 via the SAR 10 by plus one or plus two as required by the operation being performed.

The Assembler Bus 16 is a matrix which gates data from the Program Registers 1, DAR 2, Auxiliary DAR 8, Operation Register 5 (bits 8–11), and the Storage Data Bus 17 to the A and/or B registers 13 and 14.

The Arithmetic Logic Unit (ALU) 3 receives data from the A and B Registers and outputs data or results to the Program, DAR or Auxiliary DAR. Data passing through the ALU may be added, subtracted, or logically manipulated. The ALU carry, zero and non-zero latches 7 may be set depending on operation results.

The parity of incoming bits on the Storage Data Bus 7 is checked by parity checker 18. The outgoing data bits on Data Out Bus 19 also have an associated parity bit. The parity bit is generated by parity generator 20 as necessary to provide an odd number of bits in the preferred embodiment.

A gate 21 at the output of SAR 10 allows SAR bits to pass for storage addressing. (When the controller is in Test Mode, gate 21 prevents bits from SAR 10 from passing to the Storage Address Bus 22.)

There are three ALU Status Latches 7 that can be set as the result of an arithmetic, load or input instruction. These latches remain set until reset by another operation (being tested does not change their condition). All latches are reset at the same time even if the instruction being executed does not have the ability to set all latches. (This enables the use of a single machine instruction for different tests at different times as described below in the discussion of conditional branch instructions.) The carry latch 24 has two conditions that can be checked, ALU Carry and No Carry. ALU Carry is set on a Carry Out of ALU Bit 0 during an Add type operation. It can also be set during a Shift Right or Shift Right Circular instruction if there is a bit in position three of the register to be shifted. The zero latch 25 is set when zero data is output from the ALU. This latch may be on at the same time as the Carry-On Carry Latch. During Summary, Input and Load Mode operations both zero and non-zero latches may be on. The non-zero latch 26 is set when some value, other than zero is output from the ALU. This latch may be on at the same time as the Carry-No Carry Latch. Status latches are set by passing data through the ALU. When an instruction that passes two nibbles (four-bit words) through the ALU is executed, such as In, SNS or LD, the status latches are not reset for the second nibble. This is defined as "Summary Mode". Summary Mode is also set for some arithmetic instructions to allow multiple operations to be performed and tested with one Conditional Branch instruction.

The D (data) and I (instruction) Latches 9 are used to select Low or Hi Storage Addresses on storage data cycles and instruction fetches, respectively. The D latch 27 and the I latch 28 are set off or set on independently in the programming by using Set Data Low (SDL) or Set Data High (SDH) for later use during data store and fetch cycles and Set Instruction Low (SIL) or Set Instruction High (SIH) for the instruction fetch cycles.

These latches are also set on or off as a result of executing a RAL or RTN instruction. During the execution of these instructions, the D and I latches are reset/set according to the status of the D/I bits in the Link Register 6. They are set Hi (on) if the status bit is a one and set Lo (off) if the status bit is a zero. These status bits, when set on, cause the controlled to select storage locations between the 2048 and 4095 word addresses in Hi Storage. When these status bits are off, the controller will address only low storage or the first 2048 or less words. (If only 2K or less words of storage are available, these latches must not b used (set) in the programming). If more than 2K words of storage are available, these latches are used independently. For example, data fetches are made to hi or low storage depending upon the setting of the D latch; and instruction fetches are made to hi or low storage depending upon the setting of the I latch. This assures maximum flexibility for the paging mechanism.

During the machine cycle in which SDL, SDH, SIL and SIH instructions are decoded for execution and the D and I latches reset/set, storage is accessed for the next instruction based on the status of the I latch at the beginning of the cycle. Therefore, it will be during the execution of said next instruction after the SDL, SDH, SIL or SIH instruction that the access to Hi or Low storage can be made according to the new status of the D latch 27 or the I latch 28.

Storage data instructions following an SDL or SDH instruction, however, will access Hi or Low storage in accordance with the new status of the D latch 27 since they are two cycle operations.

SIL and SIH instructions are always followed by Branch type instructions. The SIL or SIH instructions will set the new page value for the Branch instruction; and the Branch instruction provides the offset address within the selected new page. The Branch and Link Instruction can be used following the SDH, SDL, SIH and SIL instructions to keep track of the storage paging sequence of Data and/or instruction references to Hi or Low storage, and provide branches to sub-routines. RTN and RAL instructions will allow returning to the interrupted series of instructions and the previous D and I latch status for storage reference. During IPL the D latch is turned on after 4096 bytes have been loaded to allow IPL up to 8192 bytes of data.

The Data Bit X Latch 23 is used to select storage/word addresses from 4096 to 8191. This latch is set in the programming by the instructions SXN and reset by the instruction SXF. When the Data Bit X latch is set, all accesses to storage will be to addresses between 4096 and 8191 with the status of the D and I latches determining whether the low, 4096 to 6143, or High 6144 to 8191, addresses will be selected. The SXN and SXF instructions can be combined with the SIL and SIH so that Branches can be made from and to any address in storage after the appropriate memory selection has been made. In the preferred embodiment, the X bit is not saved by the Link Register 6.

Addressing by the controller is oriented towards storage modules (ROS or RAM) of 1,024 words, each word having sixteen data bits (two bytes) plus two parity bits. The eight Select Storage lines 30 allow individual selection of storage modules. Bits 1 through 10 on the Storage Address Bus 22 address a module word from 0 through 1023. For a Storage Write Operation, byte selection within the two-byte word is set by the Write Storage High or Low Byte line 32 which is storage address bit eleven from SAR 10.

The data address decode unit 29 accepts three inputs; one from the data bit X latch 23, one from the D/I latches 9 (depending upon whether data or instructions are being addressed) and from the high-order bit from SAR 10 (via gate 21). The decoder 29 will convert the three-bit input to a one of eight output to select one of eight 1K blocks of storage words by raising one of eight Select Storage lines 30. The cycle control 31 is a microinstruction decoder. It decodes microinstructions that are in OP Reg 5 and, in response to those instructions along with timing signals and various controls (such as, for example, reset) it produces the gating signals for each cycle of operation. The specific details of construction of the cycle control 31 need not be given here because all details of construction of such devices are well known to those skilled in the art. Also, those skilled in the art will recognize that the device is actually defined to a large extent by defining the instruction set of a data processor. For this reason, specific implementations of such cycle control units will vary from system to system.

Microinstruction Controls

As stated above, microinstructions, are received by the OP Reg 5 from storage via Storage Data In Line 17. In the system of this preferred embodiment, each microinstruction contains sixteen bits. The first four bits define a processing Mode for the system and are always transmitted to the cycle controls 31 for decoding. The preferred embodiment of this invention is part of a system having eleven Modes defined by the first four bits of the microinstruction as follows:

| Bits 1–4 | Mode |
| --- | --- |
| 0000 | Program Register to Program Register |
| 0001 | Data Address Register to Data Address Register |
| 0010 | Program Register to Data Address Register |
| 0011 | Data Address Register to Program Register |
| 0100 | Mask to Program Register |
| 0101 | Mask to Data Address Register |
| 0110 | Input |
| 0111 | Output |
| 100x | Load |
| 101x | Store |
| 11xx | Branch and Paging |

(x means "don't care")

The meaning of the other fields (bits four through fifteen) of the microinstruction will depend upon the processing Mode. The function performed in each Mode is described below. Also, the instructions within each of the Modes are listed. For the most part, other than this listing, the following instructions will not be further described herein unless they are significant to the preferred implementation of this invention.

The first six modes listed above (PR to PR, DAR to DAR, PR to DAR, DAR to PR, MASK to PR and MASK to DAR) are all used for arithmetic and logic operations which utilize the ALU 3. In these modes, bits four through seven define the operation to be performed by the ALU 3 upon two fields of data transmitted to it. This field is an ALU Instruction and is transmitted from the OP Reg 5 to the cycle control 31 which decodes it to develop control signals for the ALU. Bits eight through eleven define an X-Field address for the PR to PR, DAR to DAR, PR to DAR and DAR to PR Modes, and a Mask for the MASK to PR and MASK to DAR Modes. Bits twelve through fifteen define a Y-Field address for all six of these Modes.

PR to PR Mode (0000): The contents of the Program Register indicated by the X-Field is combined with the contents of the PR indicated by the Y-Field in the manner controlled by the ALU Instruction. The results, if stored, are placed in the PR indicated by the Y-Field. Any of the ALU Status Latches 7 can be set by the arithmetic and shift operations. The Logical instructions can set the zero or non-zero latches. The summary instructions do not reset the latches, but OR results with existing status.

DAR to DAR Mode (0001): In this Mode, the system functions exactly as it does in the PR to PR Mode except that the X-Field and Y-Field refer to Data Address Registers.

PR to DAR Mode (0010): In this Mode, the system functions exactly as it does in the PR to PR Mode except that the Y-Field refers to a Data Address Register.

DAR to PR Mode (0011): In this Mode, the system functions exactly as it does in the PR to PR Mode except that the X-Field refers to a Data Address Register.

Mask to PR Mode (0100): In this Mode, the system functions exactly as it does in the PR to PR Mode except that bits eight through eleven specify a Mask instead of an address.

Mask to DAR Mode (0101): In this Mode, the system functions exactly as it does in the Mask to PR Mode except that the Y-Field refers to a Data Address Register.

The sixteen functions that are preformed by the ALU 3 in response to ALU Instructions (bits four through seven in the above six Modes) are

| Function | ALU Instruction (bits 4-7) |
| --- | --- |
| ADD | 0000 |
| ADD WITH CARRY | 0001 |
| MOVE | 0010 |
| SUBTRACT WITH BORROW | 0011 |
| SUBTRACT | 0100 |
| COMPARE | 0101 |
| SUBTRACT SUMMARY | 0110 |
| COMPARE SUMMARY | 0111 |
| AND | 1000 |
| TEST | 1001 |
| AND SUMMARY | 1010 |
| TEST SUMMARY | 1011 |
| OR | 1100 |
| *SHIFT RIGHT | 1101 |
| EXCLUSIVE OR | 1110 |
| *SHIFT RIGHT CIRCULAR | 1111 |

*These two functions are not performed in either of the Mask Modes.

Input Mode (0110) is used to transfer and/or test the eight bits (one byte) of data on the Data Bus In lines 33. Data is placed on these lines by the selected device whose address is defined in the operand field of the instruction in bits eight through fifteen. The address can be any value between 0 and 255 decimal or FF Hex. There are two Input Mode instructions. They are Input From Device (IN) and Sense Device (SNS). IN causes the system to gate the data on DBI 33 (the data was placed there by the selected device) and store it in PR0 and 1. PR0 contains 0-3 and PR1 contains bits 4-7. SNS is the same as IN except the data is not stored in any register, but tested for zero or non-zero status. IN and SNS instructions reset all latches 7 at the beginning of the operation. Only zero and non-zero latches can be set. The second nibble passes through the ALU 3 in Summary Mode and status latches are the OR-ed result of the two nibbles passing through the ALU. The zero and non-zero latches, 25 and 26, may both be on at the end of the operation.

Output Mode (0111) is used to transfer eight bits (one byte) of data via the Data Bus Out Lines 19 to the selected device attachment. As with the Input Mode, the device to receive the data is selected by the appropriate device address in the operand field of the instruction. The device address in the operand field cannot be greater than 255 decimal or FF Hex. There are two Output Mode instructions. They are Output To Device (OUT) and Direct Input And Output (DIO). OUT causes one byte of data from PR0 and PR1 to be sent to the device. PR0 contains bits 0-3 and PR1 contains bits 4-7. DIO is used to transfer the data on the I/O Data Bus In lines 33 to the Data Bus Out lines 19. (The device supplying the data on the DBI lines must have the same address as the device receiving the data on the DBO lines in this system.) The OUT and DIO instructions do not alter the status latches.

Load Mode (1000 except "Load Absolute Address" which is 1001): In the Load Mode, all instructions are two cycles in execution length. During the second or data cycle a full data word is read from storsage onto Storage Data Bus In 17. The Lo or Hi byte of the data word is gated for processing depending on the DAR address (bit 11) or the operand address being even or odd, respectively. The byte is gated to the PR, DAR or I/O device. Both bytes of the data word are gated to the Link Register 6 on the two Load Link Reg (LDL) instructions. There are ten different Load instructions.

Load PR (LDR) causes the system to fetch one byte of data from the storage location defined by the three DAR's. The data is placed into two PR's defined by the X-Field and Y-Field. The first half of the data byte is placed into the X-Field register and the second half is placed in the Y-Field register. The three DAR's form the twelve-bit byte address by using the contents of DAR 0 for bits 0-3, DAR 1 for bits 4-7, and DAR 2 for bits 8-11. DAR's 0, 1 and 2 must be set to the desired storage address before the Load instruction is executed. For the LDR, bits four through seven of the microinstruction are 1001.

Load PR and Increment DAR+1 (LDRP) is the same as LDR but increments the current DAR 0, 1 and 2 plus one. Bits four through seven of this microinstruction are 1011.

Load DAR (LDD) causes the system to fetch one byte of data from the storage location defined by the three DAR's D0, D1 and D2. The data is placed into the two DAR's that are defined by the X-Field and Y-Field. The first half of the data byte is placed into the X-Field register and the second half is placed in the Y-Field register. The three DAR's form the twelve-bit address by using the contents of DAR 0 for bits 0–3, DAR 1 for bits 4–7 and DAR 2 for bits 8–11. The DAR must be set to the desired address before the Load instruction is executed. For this microinstruction, bits four through seven are 0100.

Load DAR and Increment DAR+1 (LDDP) is the same as LDD but increments the current DAR 0, 1 and 2 plus one. Bits four through seven are 0110.

Load Memory indexed (LDI) uses DAR 0 and DAR 1 and the value that is coded in bits twelve through fifteen of the instruction to define the storage address. The twelve-bit address is formed by using the contents of DAR 0 as address bits 0–3, DAR 1 as address bits 4–7 and the value in the instruction as address bits 8–11. The data that is loaded goes into PR's 0 and 1. PR0 contains the first four bits and PR1 contains the next four bits. This instruction will allow the programmer to address up to sixteen storage locations without changing the contents of DAR 0 and 1. Bits four through seven are 1010. Bits eight through eleven may be ignored or may be required to be a particular configuration, for example, 0000.

Memory to I/O Device (MIO) uses the address contained in the DAR's, D0, D1 and D2, to define the storage address for data being sent to an I/O device that is identified by bits eight through fifteen of the instruction. The three DAR's form the twelve-bit address by using the contents of DAR 0 for address bits 0–3, DAR 1 for address bits 4–7 and DAR 2 for address bits 8–11. The desired address must be set in the DAR's before the MIO instruction. The value for the device to be addressed is coded in the operand field and must be between decimal 0 and 255. Bits four through seven are 1100.

Memory to I/O Device and Increment Dar+1 (MIOP) does the same as MIO but increments the current DAR 0, 1 and 2 plus one. Bits four through seven are 1110.

Load Link Register (LDL) will cause the system to load the Link Register 6 from storage at the address defined by DAR 0, 1 and 2. The DARs D0, D1 and D2 must be set up prior to using this instruction and must contain an even address since this operation addresses an entire word in storage. Bits four through seven of the first storage byte and bits zero through six of the second storage byte make up the address loaded into the Link register. Bit two of the first byte contains the control bit for the high or low data storage selection (the D Latch setting) and bit three of the first byte contains the control bit for the high or low instruction storage selection (the I Latch setting). At the same time as the LDL instruction is executed the contents of the first Backup register 11 is transferred into the second Backup Reg 12 and the contents of the Link register 6 is transferred into the first Backup Reg in the same manner as a BAL instruction would do. This instruction can be used to initialize Link Register 6 for the RAL instruction. Bits four through seven are 0000. Bits eight through fifteen may be ignored.

Load Link Register and Increment DAR+2 (LDLP) does the same as LDL but increments the current DAR 0, 1 and 2 plus two. Bits four through seven are 0010.

The Load instructions, except MIO, MIOP, LDL and LDLP reset all ALU Status Latches 7 at the beginning of each operation. Only zero and non-zero latches, 25 and 26, can be set. The second nibble (half byte) passes through the ALU 3 in Summary Mode and the status latches are the OR-ed result of the two nibbles passing through the ALU. The zero and non-zero latches may both be on at the end of the operation. The MIO, MIOP, LDL and LDLP instructions do not alter status latches.

Store Mode (1010 except "Store In Absolute Address" which is 1011): These instructions are essentially the opposite of the Load Mode instructions. In Load Mode, transfers are from storage to registers. In Store Mode, transfers are from registers to storage.

Except for STI and STA, all the Store Mode instructions store one byte of data in storage whose address is defined by the active DAR 0, 1 and 2. These registers form the twelve-bit address by using the contents of DAR 0 for address bits 0–3, DAR 1 for address bits 4–7 and DAR 2 for address bits 8–11. Bit eleven, if on, will cause the store to be in the Hi Byte whereas bit eleven being off will cause the store to be in the Lo Byte half of the word. DAR 0, 1 and 2 must be set to the desired address before the store instruction is executed. A Store Mode instruction will be treated as a NO-OP for read-only storage. The Store Mode instructions do not alter status latches.

The following eight Store Instructions are simply the reverse of their Load Mode counterparts (bits four through fifteen are the same): Store PR (STR), Store PR And Increment DAR+1 (STRP), Store DAR (STD), Store DAR And Increment DAR+1 (STDP), I/O Data to Memory (IOM), I/O Data to Memory and Increment DAR+1 (IOMP), Store Memory Indexed (STI) and Store in Absolute Address (STA).

In Store Mode, there are four instructions relating to the Link register. (In Load Mode there were two.) They are defined below.

Store Link High Order (SLH) causes the system to store the high order bits of the Link register 6 into a storage address defined by the first three DAR's which must be set up prior to the execution of this instruction. It will store the D and I status bits of the Link Register into storage bits two and three and set storage bits zero and one to zero. Storage bits four through seven will receive bits zero through three of the Link Register address field. This instruction must store the Link Register high order bits into an even byte address so they will be available as the higher order part of a full word to the LDL and LDLP instructions.

Store Link High Order and Increment DAR+1 (SLHP) does the same as SLH but increments the DAR's D0, D1 and D2 plus one.

Store Link Low Order (SLL) causes the system to store bits four through ten of the Link Register 6 address field into bits position zero through six of the storage location defined by the contents of DAR 0, 1 and 2. Bit seven of the storage location will be set to zero. The SLL instruction must store the Link Register low order bits into an odd byte address and it must be the byte after the even byte used with the SLH instruction. This will allow the stored contents of the link Register 6 to be available for reloading by the LDL instructions.

Store Link Low Order And Increment DAR+1 (SLLP) does the same as SLL but increments the DAR's D0, D1 and D2 plus one.

Branch Mode (11xx): The controller which forms the environment of the preferred embodiment of this invention can execute six unconditional branch instructions. Three utilize the Link Register 6. All branch target addresses are full word (two byte) addresses and are defined by bits four through fourteen. The addresses must be even because all instructions start on even byte boundaries. Bit fifteen is part of the mode function for branch instructions. The instruction located at the branch target address will be fetched from storage for execution. The branch target address will be incremented by one and placed in the IAR 4 so that the IAR will contain the address of the next instruction to be executed.

Branch and Wait (BAW) will cause the system to branch and then stop the controller clock after the branch is executed. The controller will start when a Start Clock pulse is received. A system reset will also take the controller out of a Branch and Wait condition. Bits one through three of this microinstruction are 1100. Bits four through fourteen specify the branch target address. Bit fifteen is 0.

Branch (B) is an unconditional branch of the address defined in bits four through fourteen. Bits zero through three are 1101. Bit fifteen is 1.

Branch and Link (BAL) is an unconditional branch (to the address in bits four through fourteen) which also causes the address of the next sequential instruction (after the BAL) and the status of the D and I latches to be placed in the Link register for future reference by a RTN or RAL instruction. Bits zero through three are 1110. Bit fifteen is 0. In this preferred system, up to three BAL instructions may be given before a RTN instruction is issued without losing the return address. The BAL instruction also causes Link Reg contents to be transferred to the first Backup Reg 11 and Backup Reg 11 contents to be transferred to the second Backup 12. If more than three BAL instructions are issued, only the last three addresses will be saved.

Branch Via Link Register or Return (RTN) causes an unconditional branch to the address that is contained in the Link register. Also, the D and I latches are set early in the cycle of operation according to the D and I status bits in the Link Register. Additionally, the contents of the first Backup Reg 11 are transferred to the Link Reg, and the contents of the second Backup Reg 12 are transferred to the first Backup Reg 11. RTN has the format 1111 0000 0000 0001.

Return and Link (RAL) uses the Link Register 6, the D/I latches 9 and the IAR 4. The Link Register must have been loaded prior to the execution of the RAL instruction (by, for example, a BAL, an LDL or an LDLP). At the time of execution, the contents of the Link Register 6 is used for the next instruction address and then the contents of the IAR 4 and the Delay Register 35 (which contains the value in the D and I Latches 9 from the previous instruction execution) are placed in the Link Register 6. The RAL instruction cannot follow a SDH, SDL, SIH or SIL instruction in the preferred embodiment; i.e. this would be an invalid sequence. This RAL instruction does not cause changes in the contents of either of the Backup Regs 11 or 12. (BAL and RTN do change those Regs.) In this preferred embodiment, RAL has the format 1111 0010 0000 0001.

Branch Via DAR (BVD) causes a branch to the address formed by the three DAR's. DAR 0 supplies address bits zero through three, DAR 1 supplies address bits four through seven and DAR 2 supplies address bits eight through ten of the target storage address. The low order bit from DAR 2 (bit eleven) is not used for the storage reference. This assures that all branches are to an even byte boundary. The contents of the DAR's are not changed by this instruction. BVD has the format 1111 1000 0000 0001.

There are also ten conditional branch instructions in the environmental system. They are listed below along with the bit configuration for bits zero through three and fifteen. Bits four through fourteen define the branch target address.

| Instruction | Bits 0-3 | Bit 15 |
|---|---|---|
| BRANCH NO CARRY | 1100 | 1 |
| BRANCH CARRY | 1101 | 0 |
| BRANCH NOT ZERO | 1110 | 1 |
| BRANCH ZERO | 1111 | 0 |
| BRANCH HIGH | 1100 | 1 |
| BRANCH LOW ON EQUAL | 1101 | 0 |
| BRANCH NOT EQUAL | 1110 | 1 |
| BRANCH EQUAL | 1111 | 0 |
| BRANCH TRUE | 1110 | 1 |
| BRANCH FALSE | 1111 | 0 |

The bit configuration of some of these instructions is identical to other instructions. For example, Branch Not Zero, Branch Not Equal and Branch True all have the bit configuration 1110...1 and thus are actually the same instruction. The actual meaning of these instructions will depend upon their use in a program. The first four instructions listed above are used after an arithmetic operation. The next four instructions are used after a compare operation. The last two instructions are used after a test operation. Each of these Branch instructions actually causes one latch to be tested, but the meaning of the setting of the various latches is determined by the previous operation.

The link mechanism for saving addresses (Link Register 6) includes a mechanism for initializing the link (Cycle Control 31 which controls the system response to BAL, LDL and LDLP instructions) and a mechanism for transferring control to the address saved in the link mechanism and for setting the link to a new value (Cycle Control 31, in response to a RAL instruction, causes the contents of Link Register 6 to be transferred to the SAR 10 and the I bit to the decode 29 to fetch the next instruction, causes the D/I bits in the Link Register 6 to be transferred to D/I Latches 9, causes the Link Address in SAR to be incremented and stored into the IAR 4, and causs the contents of the delay register 35 and the IAR 4 to be transferred to Link Register 6.)

Figure 2:
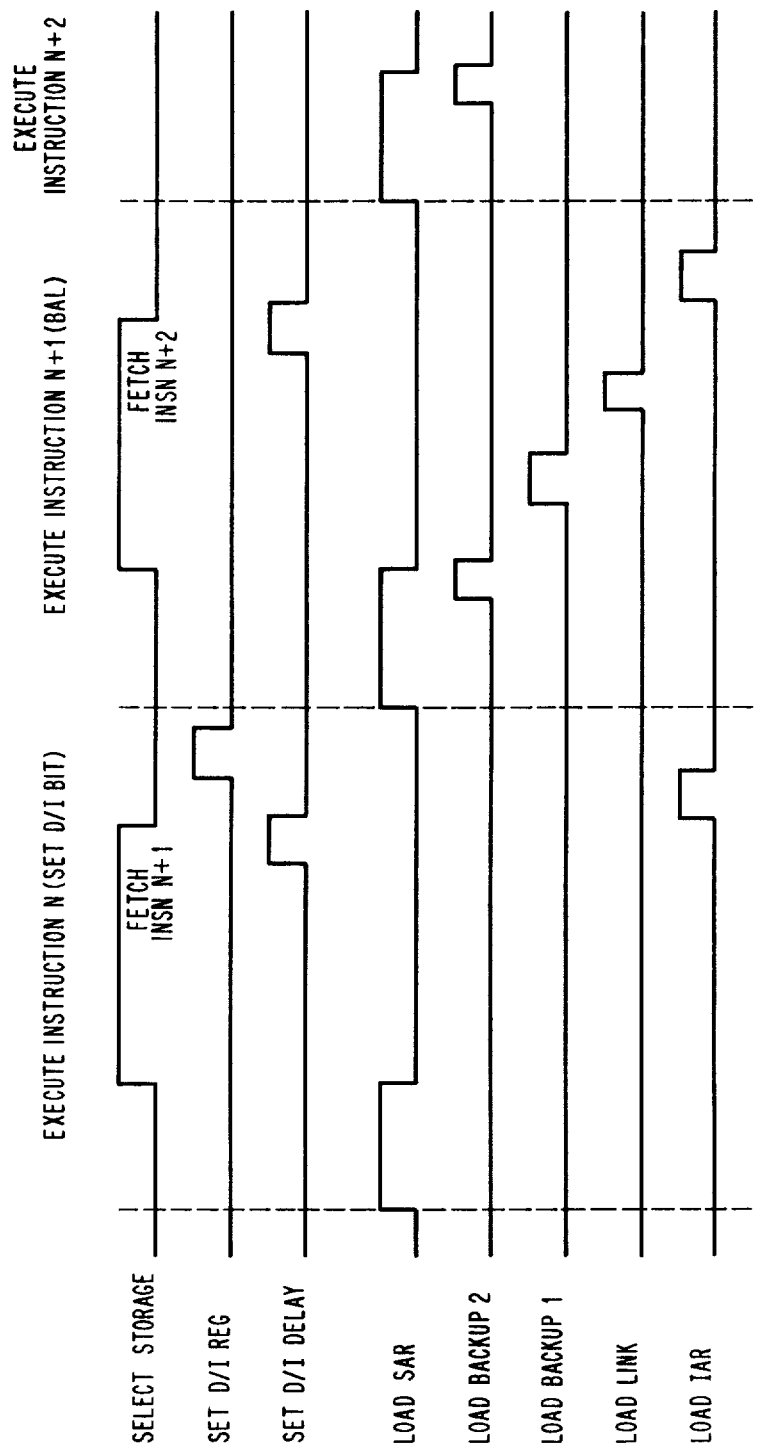
FIG. 2 is a timing diagram to better illustrate the operation of this invention.

The delay register 35 (which is, by way of example, a pair of latches for intermediate storage if only one pair of D and I latches 9 are used) is utilized during the interchange of the contents of LR 6 with the contents of D/I Latches 9 and IAR 4. Before receiving an input that would change the D/I Latches during SDH, SDL, SIH, SIL instructions, their contents ae transferred to the delay register 35 (FIG. 2). However, during a RAL instruction, the interchange of LR 6 contents with D/I Latch and IAR contents is accomplished as follows. The paths from LR 6 to SAR 10 and from LR 6 to D/I Latches 9 are activated early in the cycle (FIG. 2) to transfer the LR contents to the SAR and the D/I Latches (as is done for a RTN instruction, except in this case the Backup Regs 11 and 12 are not affected). The I bit in LR 6 is also gated to the decode 29. The decode 29 and SAR 10 fetch the "branched to" instruction using the address from LR 6. The address bits in SAR 10 are updated by incrementer 15 and stored in IAR 4. This sets up the addressing mechanism of the system so that the next instruction to be fetched from storage will be the one following the previously established return point. Then the paths from IAR 4 to LR 6 and from Delay 35 (which contains the previous contents of the D/I Latches of the peceding instruction) to LR 6 are activated to transfer the IAR contents and the old D/I contents to the LR (as is done for a BAL instruction, except in this case the Backup Regs 11 and 12 are not affected). This establishes in the LR 6 the information that will later be used by another RAL (or by a TRN) instruction to return to the instruction following this RAL. Then the path from the SAR 10 through the Incrementer 15 to the IAR 4 is activated, causing the new contents of SAR 10 (which it received from LR 6) to be incremented by +2 (because instruction addressing is on word boundaries) and stored in IAR 4. The IAR 4 thus contains the address of the instruction which follows the instruction at the previously established return point.

The D/I registers 27, 28 are coupled to the Decode 29 by way of AND circuits 40, 41 respectively and OR circuit 42. An Instruction Cycle line 44 from Cycle Controls 31 is connected directly to one input of AND circuit 41; and a Data Cycle line 43 is connected to one input of AND circuit 40. During instruction fetch operations other than RTN and RAL (when the I bit is gated from the Link Register 6 to the Decode 29), a pulse on line 44 gates the I bit from latch 28 to Decode 29 by way of AND circuit 41 and OR circuit 42. During data fetch operations, a pulse on line 43 gates the D bit from latch 27 to Decode 29 by way of AND circuit 40 and OR circuit 42. In the preferred embodiment, the gating of the D/I bits to Decode 29 occurs during the Load SAR time shown in FIG. 2. The D/I bits are gated to the Delay Register 35 at Set D/I Delay Time (FIG. 2) during the execution of each instruction. This assures the correct D/I values (of the current routine or subroutine) being available for the BAL type instructions. Then, at the Load Link Register Time (FIG. 2) of a BAL instruction, the D/I bits are transferred from the Delay Register 35 to the Link Register 6.

The SDH and SDL instructions take the format 1111 11X0 0001 where the X bit is a logical 1 (Hi) or 0 (Low). The SIH and SIL instructions take the format 1111 0100 1000 X001 where the X bit is a logical 1 (Hi) or 0 (Low). As seen in FIG. 2, the D/I bits are set into the D/I Registers 27, 28 late in the execution cycle. Transfer of the D/I bits to the Delay Register 35 occurs prior to the setting of the D/I Registers 27, 28.

This provides a mechanism for easily linking between computer programs, thus enabling substantially concurrent operation of two separate programs. This facility is provided without the overhead (e.g., complexity, cost, programming effort, etc.) that would be introduced by an interrupt system. Additionally, this mechanism will link between programs more quickly than the prior art mechanisms discussed above. This latter point is particularly important in an I/O controller, which may need to monitor two devices at the same time and respond very quickly to either of them.

While the invention has been particularly described with reference to a preferred embodiment thereof, those skilled in the art will recognize that various changes in form and details may be made therein without departing from the spirit and scope of the invention.

What is claimed is:

1. For use in a data processing system, apparatus for branching and linking between computer routines located in the same or different pages of a store, said apparatus comprising:
    said store adapted to hold program instructions and their corresponding data in the same or different pages of said store;
    offset address means for storing a current instruction page offset address value;
    data register means for storing current data page offset address values;
    page register means for storing current data page and instruction page address values corresponding to any page in said storage;
    link means for storing page address and page offset address values to enable return of control to an instruction following a branch and link instruction;
    delay means;
    a source of instructions in said store;
    means responsive to a first type of instruction from said source for transferring the current data and instruction page address from the page register means to the delay means, for setting a new instruction page address from said first type of instruction into the page register means for fetching a second type of instruction following said first type of instruction and for updating the current offset address value in said offset address means; and
    means responsive to said second type of instruction for fetching an instruction in the new page in accordance with the new page address in said page register means and the offset address bits in said second type of instruction and for transferring said current data and instruction page address values from the delay means and the updated current offset address value from the offest address means to the link register.

2. The system of claim 1, further comprising:
    means responsive to a third type of instruction from said source for utilizing the page address and offset address in said link register to return to the previous routine.

3. The system of claim 1, further comprising:
    means responsive to a fourth type of instruction from said source for utilizing the page address and offset address in said link register to return to the previous routine, and to also load another page address and offset address into said link register from a previously executed instruction.

4. For use in a data processing system, apparatus for branching and linking between computer routines located in the same or different pages of a store wherein branch instructions in said routines have address fields capable of storing only the offset address of a location within a page to be branched to; said apparatus comprising:
    said store adapted to hold program instructions and related data in the same or different pages of said store;
    an instruction address register for storing a current instruction page offset address value;
    data register means for storing current data page offset address values;
    page register means for storing current data and instruction page address values each corresponding to any page in said store;
    a link register for storing page address and page offset address values to enable return of control to an instruction following a branch and link instruction;
    a delay means;

means responsive to a particular format of instruction for transferring the current data and instruction page address from the page register means to the delay means, for setting a new instruction page in register means, for fetching the next sequential instruction following the instruction having said particular format and for updating the current offset address value, said next instruction having another particular format; and means responsive to said next instruction for fetching an instruction in the new page in accordance with the new page address in said page register and the offset address bits in said next instruction and for transferring said current data and instruction page address values from the delay means and the updated current offset address value from the instruction address register to the link register.

5. The system of claim 4, further comprising:

at least one backup register means for storing a page address and an offset address; and means responsive to occurrence of at least another branch and link operation occurring prior to completion of the present branch and link operation to transfer the page address and offset address from said link register to said backup register and to store the current page address and offset address for the subsequent branch and link operation in said link register.

6. The system of claim 4 wherein provision is made in said system for returning from a branch and link operation involving one computer routine in a selected page of said store to a different computer routine in another page of said store, and further comprising:

means responsive to occurrence of a return instruction for setting the page register means in accordance with the current page address in said link register and for utilizing this current page address in conjunction with the offset address contained in the link register for accessing the next instruction to be executed.

7. The system of claim 4, further comprising:

latch means incorporated in said page register means settable to a first state for selecting a first page in said store and to a second state to select a second page in said store;

cycling means in said system for providing signals indicative of data cycles and instruction cycles;

means interconnecting said cycling means to said page register means for activating said page register means to a data or instruction state as required during operations; and means responsive to the page addresses established by said page register in conjunction with offset addresses for accessing instruction and data locations in said store during system operations.

8. The system of claim 7 wherein said latch means comprises a data latch settable to establish data page address values and an instruction latch settable to establish instruction page address values, said system further comprising means responsive to instructions having additional other particular formats for selectivey setting said data latch and said instruction latch.

9. The system of claim 8 wherein offset addresses for instructions are derived from said instruction address register, and further comprising:

data address register means;

means for deriving offset addresses for data from said data address register means.

* * * * *